Feb. 15, 1949.  W. P. RUSSELL  2,461,926
EDUCATIONAL DEVICE
Filed Feb. 18, 1946  2 Sheets-Sheet 1
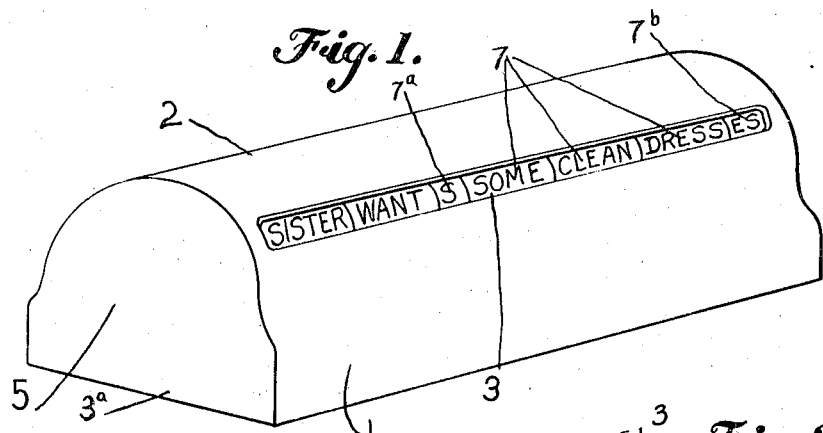
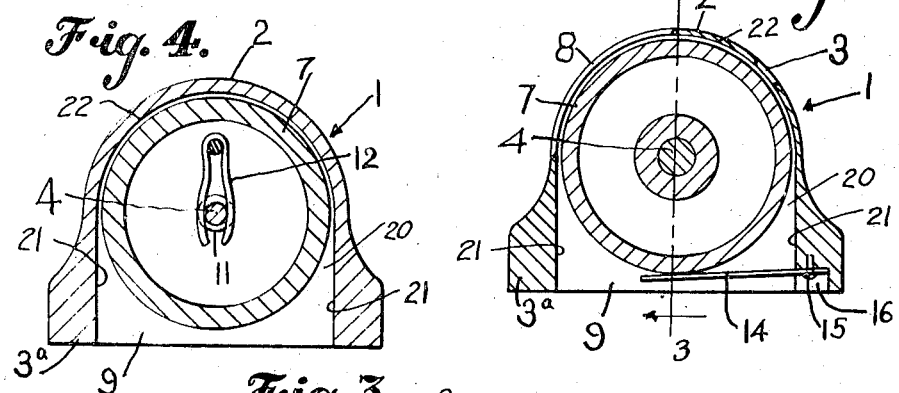
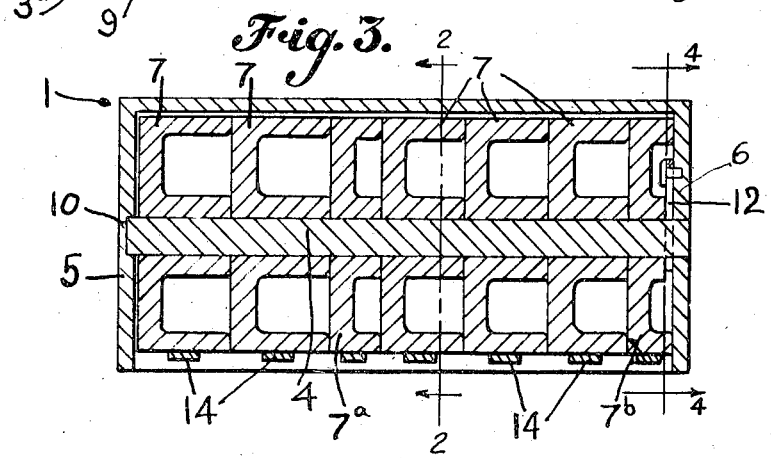
INVENTOR.
BY Winfield P. Russell
Heard Smith & Tennant
Atty's.

Feb. 15, 1949. W. P. RUSSELL 2,461,926
EDUCATIONAL DEVICE
Filed Feb. 18, 1946 2 Sheets-Sheet 2
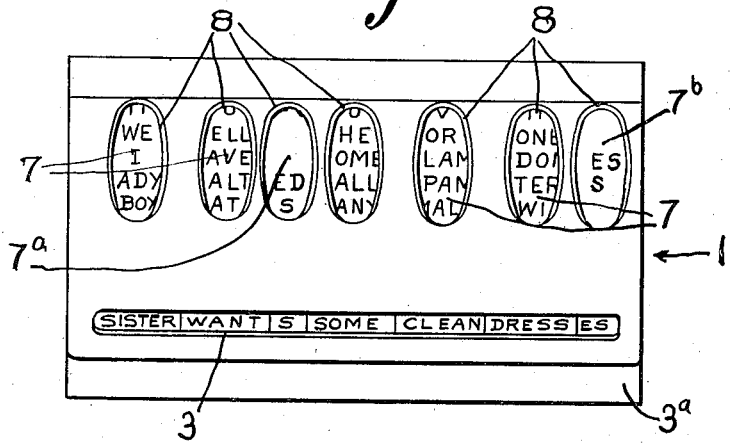
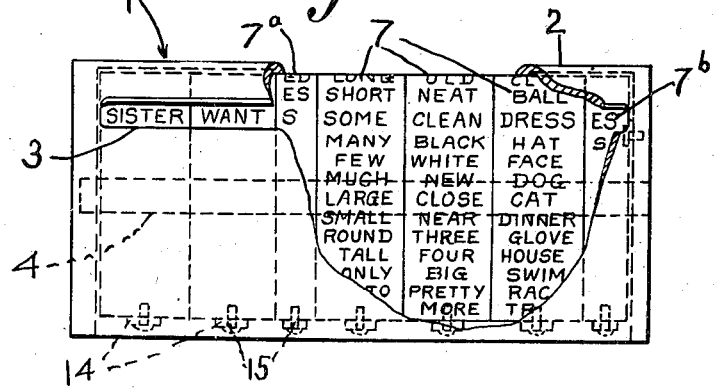
INVENTOR.
BY Winfield P. Russell
Heard Smith & Tennant
Atty's.

Patented Feb. 15, 1949

2,461,926

UNITED STATES PATENT OFFICE 2,461,926

EDUCATIONAL DEVICE

Winfield P. Russell, Malden, Mass.

Application February 18, 1946, Serial No. 648,365

3 Claims. (Cl. 35—77)

This invention relates to an educational device designed especially for the purpose of giving instruction to young children who are learning to read.

One object of the invention is to provide a device of this character by which a child is given assistance in coordinating the written and the spoken word.

Another object of the invention is to provide an educational device which embodies the principle of "learning by doing" so that while a child is getting experience in coordinating the written and spoken word, he is also developing coordination between his eyes and his fingers.

Further objects of the invention are to improve educational devices in various particulars as will be more fully hereinafter set forth.

In the drawings,

Fig. 1 is a perspective view of an educational device embodying my invention.

Fig. 2 is a section on the line 2—2 Fig. 3.

Fig. 3 is a section on the line 3—3 Fig. 2.

Fig. 4 is a section on the line 4—4 Fig. 3.

Fig. 5 is a top plan view of Fig. 1.

Fig. 6 is a front side view of Fig. 1 with a portion of the casing broken out.

My improved device comprises a housing or casing member 1, which is herein shown as having a semi-cylindrical top portion 2 and a relatively wide base portion 3a, having a flat bottom. The casing, or housing, is made with an interior chamber 20 which has vertical side walls 21 and a semi-cylindrical roof 22, the ends of the chamber being closed by the end walls 5 and 6 of the casing.

Situated within the chamber 20, and extending lengthwise thereof axially of the semi-cylindrical roof 22, is a supporting shaft 4, the ends of the shaft being mounted in the end walls 5 and 6 of the casing.

Mounted on the shaft 4 are a plurality of cylindrical elements 7, each of which has on its periphery a plurality of words, letters, or other indicia. The front casing is provided with a reading slot 3 which extends from one end to the other of the chamber 20. Each cylindrical element or roll 7 is freely rotatable on the shaft 4 and can be rotated independently of any other roll, thereby to bring any word or other indicia thereon into register with the reading slot.

The words, or indicia, on the periphery of each roll 7 may be printed directly on the roll, or may be imprinted on a strip of paper pasted to the circumference of the roll. In either event, the words, or other indicia, are arranged parallel to the axis of the roll.

In the illustrated embodiment of my invention, the indicia on the rolls are words and suffixes, and they are arranged on the various rolls so that, by the proper manipulation of the rolls, complete sentences can be formed. For instance, the words on the first roll at the left may be nouns or pronouns or names of persons which can form the grammatical subject of a completed sentence. The words on the next roll may be verbs which can form the grammatical predicate of a completed sentence.

The words on other rolls may be qualifying words such as adverbs or adjectives, and the words on the roll at the right of the casing may be nouns which could form the object of a sentence.

The casing 1 is provided in its back side with a plurality of elongated finger openings 8, there being one such finger opening for each roll or cylindrical member 7. The finger openings are preferably somewhat elongated in a peripheral direction so that a person may introduce his finger into any opening 8, and by moving his finger while in contact with the corresponding roll, the latter will be turned about its axis, thereby bringing any desired word on said roll into register with the reading opening or slot 3.

In the illustrated embodiment of the invention, there are provided two narrow rolls 7a and 7b, on the periphery of which are the necessary suffixes to either pluralize the words on the roll immediately to the left, or to indicate the tense of the verb words. These suffixes might be either the letter "s" or the suffix "es" depending upon the character of the word which is to be pluralized, or the suffix "ed" when a verb in the past tense is required.

The casing 1 is open at the bottom as shown at 9, and the opening 9 has the same size and shape as that of the chamber 20 taken on a horizontal plane. Said opening is large enough so that the rolls 7 may be introduced into position through said opening.

The shaft 4 is supported at one end in a recess 10 formed in the end wall 5, while the end wall 6 has a through opening in which the shaft is received.

The rolls and the shaft can be assembled with the casing by first introducing the rolls into the casing through the open bottom 9, and then introducing the shaft 4 through the end wall 6 and through the various alligned rolls.

Any suitable means may be employed for holding the shaft 4 from lengthwise movement. As herein shown, said shaft is provided near its end with a groove 11, adapted to receive spring fingers 12 that are carried by the inner face of the end wall 6. Each roll 7 has associated therewith a friction brake device which serves to frictionally hold the roll in adjusted position and which also prevents the roll from over-running when it is being adjusted. Each friction brake device comprises a resilient arm 14 which is fastened at one end to the base as shown at 15, and the free end of which rests against the under side of the corresponding roll as best seen in Fig. 2. The base portion 3a of the casing is formed on the under face with a series of recesses 16 in which the outer ends of the arms 14 are received, each arm being secured in place by a screw or other fastening device.

In using the device, the teacher or the pupil may insert her finger through the finger opening for the roll 7 at the left, and may manipulate said roll to bring any desired word thereon, such as the word "sister," into register with the reading slot 3. The next roll, the one carrying verb words, may then be manipulated to bring some desired verb word, such as the word "want," into register with the reading opening, and the roll 7a may be manipulated so as to make the verb word either singular or plural as desired.

The roll 7 at the right may then be manipulated so as to bring some word, such as "dress," into register with the reading slot 3 to form a proper grammatical object to the sentence that is being composed, and the intermediate rolls may then be manipulated to bring proper qualifying words into register with the reading opening so as to complete the sentence, and if necessary, the roll 7b will be manipulated so as to pluralize the word constituting the grammatical object of the sentence.

After the sentence has been composed as above described, the sentence can be readily changed by shifting the roll at the left so as to bring any other noun into register with the reading slot, and similarly, the sentence can be changed by shifting the roll at the right to bring some different word into register with the reading slot to form the grammatical object of the composed sentence.

Similarly, by changing the intermediate rolls 7, the qualifying words may be changed without changing the subject, predicate, or object of the sentence.

If the pupil is encouraged to manipulate the various rolls, he will thus gain experience in coordinating the muscular action of his fingers with the reading of the words through the reading slot.

The device herein shown constitutes a simple and inexpensive device which may form an important aid in teaching small children to read. It is to be noted that the rolls 7 are entirely enclosed in the chamber 20, and the only portion of the rolls visible to a person situated in front of the casing is that portion that can be seen through the reading slot. Hence, a child using the device will not be distracted by seeing other portions of the rolls than those exposed through the reading slot.

I claim:

1. An educational device comprising a casing having a flat bottom, a semi-cylindrical upper portion and closed ends, said casing being provided with an interior chamber having vertical sides and ends, and also having a semi-cylindrical roof portion, said casing having on its front side a reading slot extending from one end to the other of said chamber, a supporting shaft extending from one end of said chamber to the other and situated axially of the semi-cylindrical roof portion of the chamber, a plurality of rolls mounted on said shaft for rotative movement thereabout, said rolls being entirely enclosed within the chamber and each roll having on its periphery a plurality of indicia, any one of which can be brought into register with the reading slot by turning said roll on its axis, said casing having on its rear side a plurality of separate elongated finger openings, one for each roll, into each of which finger openings a person may insert his finger to turn the corresponding roll, thereby to bring any one of the indicia thereon into register with the reading slot.

2. An educational device comprising a casing having a flat bottom, a semi-cylindrical upper portion and closed ends, said casing being provided with an interior chamber having vertical sides and ends and also having a semi-cylindrical roof portion, said casing having on its front side a reading slot extending from one end to the other of said chamber, a supporting shaft extending from one end of said chamber to the other and situated axially of the semi-cylindrical roof portion of the chamber, a plurality of rolls mounted on said shaft for rotative movement thereabout, said rolls being entirely enclosed within the chamber and each roll having on its periphery a plurality of indicia, any one of which can be brought into register with the reading slot by turning said roll on its axis, said casing having on its rear side a plurality of separate elongated finger openings, one for each roll into each of which finger openings a person may insert his finger to turn the corresponding roll, thereby to bring any one of the indicia thereon into register with the reading slot, the bottom of the casing having an opening therethrough of a size and shape corresponding to the horizontal cross-sectional shape of the chamber, through which opening the rolls may be introduced into the chamber or removed therefrom.

3. An educational device comprising a casing having a flat bottom, a semi-cylindrical upper portion and closed ends, said casing being provided with an interior chamber having vertical sides and ends, and also having a semi-cylindrical roof portion, said casing having on its front side a reading slot extending from one end to the other of said chamber, a supporting shaft extending from one end of said chamber to the other and situated axially of the semi-cylindrical roof portion of the chamber, a plurality of rolls mounted on said shaft for rotative movement thereabout, said rolls being entirely enclosed within the chamber and each roll having on its periphery a plurality of indicia, any one of which can be brought into register with the reading slot by turning said roll on its axis, said casing having on its rear side a plurality of separate elongated finger openings, one for each roll, into each of which finger openings a person may insert his finger to turn the corresponding roll, thereby to bring any one of the indicia thereon into register with the reading slot, the bottom of the casing having an opening therethrough of a size and shape corresponding to the horizontal cross-sectional shape of the chamber, through which opening the rolls may be introduced into the chamber or removed therefrom, a plurality of resilient arms, one for each roll, each arm being secured at one end to a side wall of the chamber, and having its free end frictionally engaging the periphery of a roll.

WINFIELD P. RUSSELL.

REFERENCES CITED

The following references are of record in the file of this patent:

UNITED STATES PATENTS

| Number | Name | Date |
|---|---|---|
| 52,758 | Skinner | Feb. 20, 1866 |
| 69,482 | Richardson | Oct. 17, 1867 |
| 1,158,774 | Beard | Nov. 2, 1915 |
| 1,256,224 | Habart | Feb. 12, 1918 |
| 1,391,986 | Smith | Sept. 27, 1921 |
| 1,470,845 | Johnson | Oct. 16, 1923 |
| 1,519,554 | Rosenthal | Dec. 16, 1924 |
| 2,204,931 | Gonzalez | June 18, 1940 |

FOREIGN PATENTS

| Number | Country | Date |
|---|---|---|
| 3,540 | Great Britain | 1888 |
| 136,423 | Great Britain | Dec. 18, 1919 |
| 789,526 | France | 1935 |